(12) United States Patent
Maruo

(10) Patent No.: US 12,181,024 B2
(45) Date of Patent: Dec. 31, 2024

(54) MOTOR WITH SPEED REDUCER

(71) Applicant: DENSO CORPORATION, Kariya (JP)

(72) Inventor: Kazuki Maruo, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/384,446

(22) Filed: Oct. 27, 2023

(65) Prior Publication Data

US 2024/0052914 A1 Feb. 15, 2024

Related U.S. Application Data

(63) Continuation of application No. PCT/JP2022/005482, filed on Feb. 10, 2022.

(30) Foreign Application Priority Data

Apr. 30, 2021 (JP) .................................. 2021-077981

(51) Int. Cl.
*F16H 19/02* (2006.01)
(52) U.S. Cl.
CPC .................................. *F16H 19/02* (2013.01)
(58) Field of Classification Search
CPC ....................................................... F16H 19/02

USPC .............................. 74/437, 116, 61, 332, 89
See application file for complete search history.

(56) References Cited

U.S. PATENT DOCUMENTS

2019/0356196 A1* 11/2019 Izuchi .................... H02K 7/116
2021/0324942 A1 10/2021 Sakai et al.

FOREIGN PATENT DOCUMENTS

JP 2020-016331 A 1/2020

* cited by examiner

*Primary Examiner* — T. Scott Fix
(74) *Attorney, Agent, or Firm* — Oliff PLC

(57) ABSTRACT

A speed reducer-equipped motor includes a motor, a helical gear, an eccentric shaft, a stationary gear with a second stopper, a transmission gear, an output gear unit, and a lock gear with a first stopper. The first stopper mechanically contacts with the second stopper, thereby stopping the lock gear from revolving and rotating to stop the rotation of the output gear unit. A physical load which is generated by the contact of the first stopper with the second stopper and acts on that contact and a physical load which is generated by the contact of the first stopper and the second stopper and acts on meshed portions of teeth of the first stopper and the second stopper are oriented in opposite directions.

5 Claims, 12 Drawing Sheets

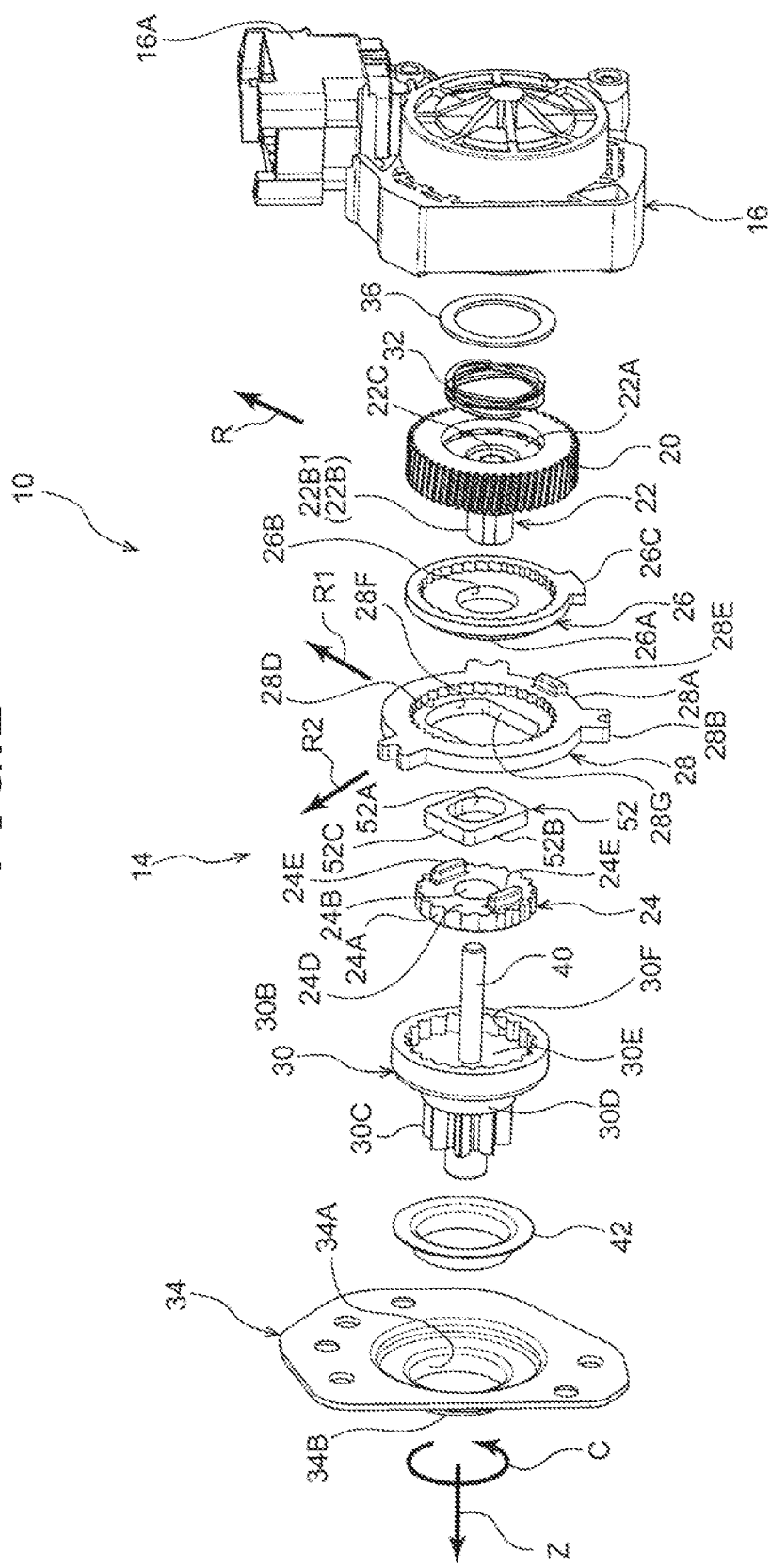

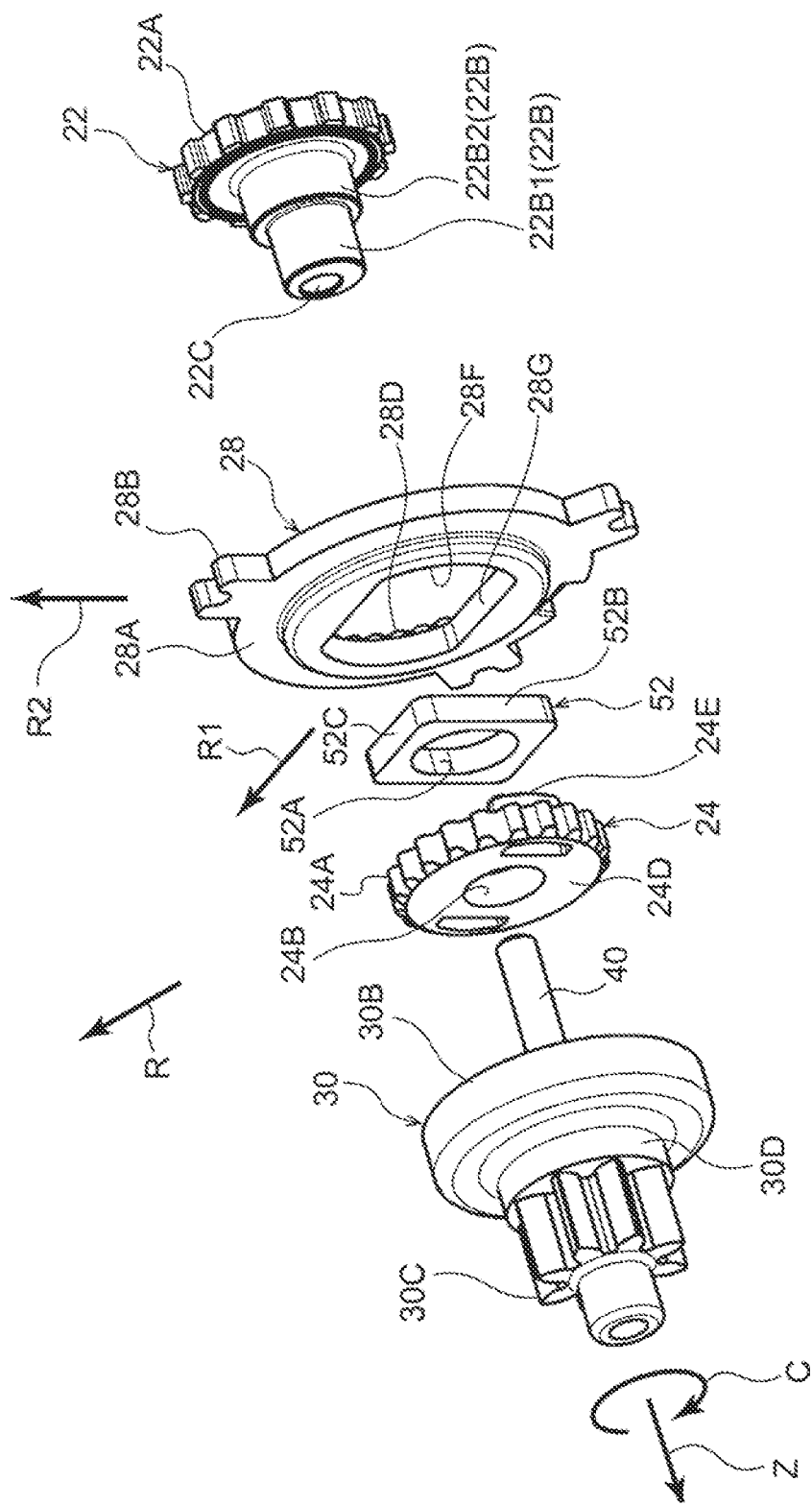

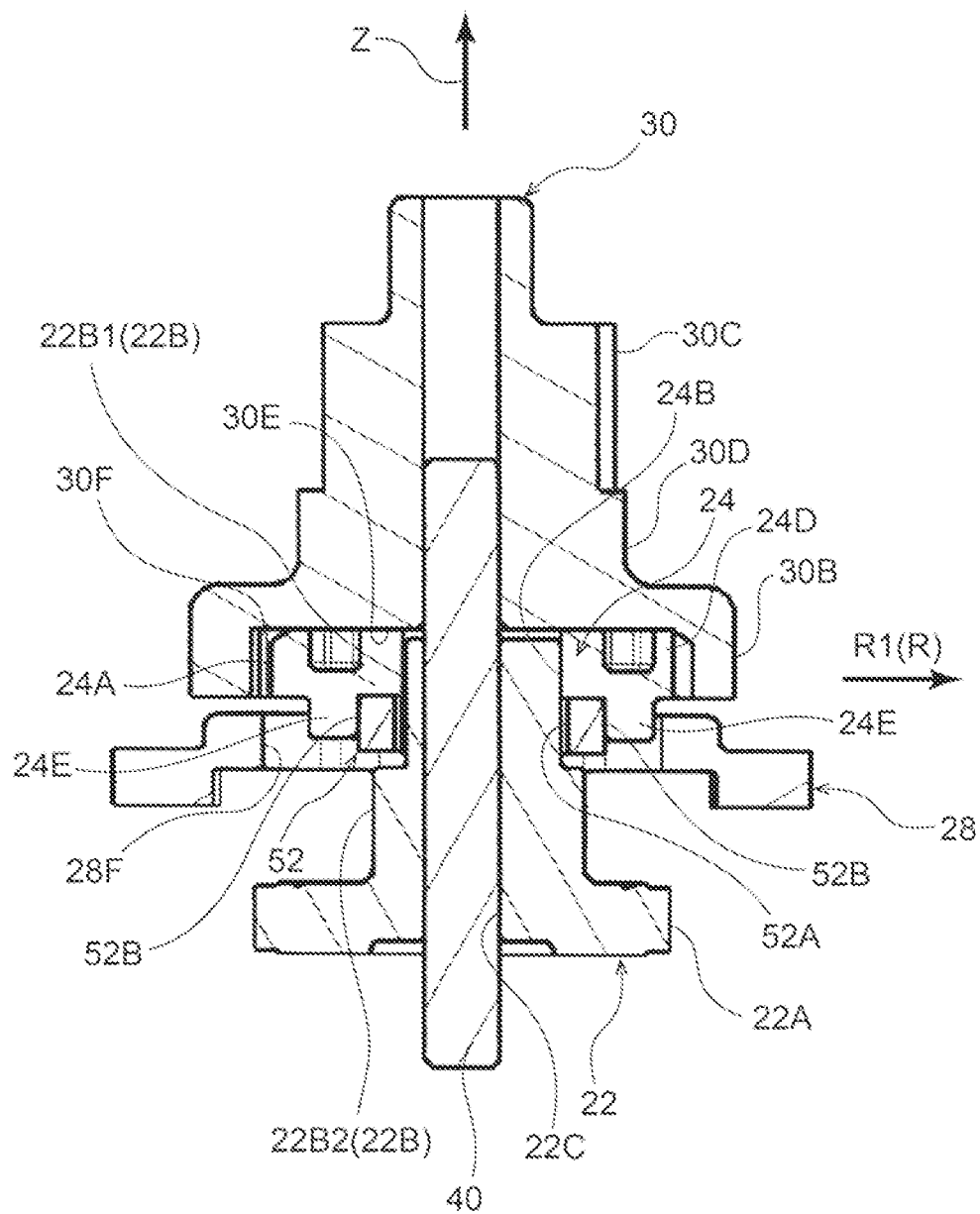

MOTOR WITH SPEED REDUCER

The present application claims the benefit of priority of Japanese Patent Application No. 2021-077981 filed on Apr. 30, 2021, the disclosure of which is incorporated in its entirety herein by reference.

TECHNICAL FIELD

This disclosure relates generally to a motor with a speed reducer.

BACKGROUND OF ART

Patent literature 1 discloses a motor equipped with a speed reducer which reduces the speed of rotation of the motor. The speed reducer includes a helical gear, an eccentric shaft, a stationary gear, and a transmission gear. The helical gear works to reduce the speed of rotation of the motor and transmit it to an output gear unit. The speed reducer also includes a lock gear which revolves around an axis of rotation of the helical gear and also rotates around an axis thereof in engagement with the stationary gear. The stop of rotation of the output gear unit is achieved by stopping the revolution and rotation of the lock gear.

PRIOR ART DOCUMENT

Patent Literature

Patent Literature 1: Japanese patent first publication No. 2020-16331

SUMMARY OF THE INVENTION

The structure equipped with the lock gear used to stop the output gear unit from rotating faces a drawback in that a mechanical impact arising from the stop of the revolution and rotation of the lock gear will be exerted on a housing retaining the stationary gear. In terms of ensuring the mechanical strength of the housing, it is advisable to minimize the impact transmitted to the housing.

It is an object of this disclosure to provide a speed reducer-equipped motor which is designed to minimize the mechanical impact acting on the housing when the revolution and the rotation of the lock gear is stopped.

According to one aspect of this disclosure, there is provided a speed reducer-equipped motor which comprises (a) a motor with a rotating shaft; (b) a first gear which rotates in response to supply of torque from the rotating shaft of the motor; (c) an eccentric shaft which connects with the first gear and includes a first support and a second support which are offset from a rotating shaft of the first gear in a radial direction thereof; (d) a stationary gear which is arranged outside the eccentric shaft in a radial direction of the eccentric shaft and includes a stationary gear stopper, the stationary gear being stopped from rotating by securement thereof with a housing; (e) a transmission gear which is retained by the first support and revolves around the rotating shaft of the first gear in response to rotation of the first gear along with the eccentric shaft; (f) an output member which rotates in response to revolution of the transmission gear; and (g) a lock gear which is retained by the second support, meshes with the stationary gear, and includes a lock gear stopper. The lock gear revolves around the rotating shaft of the first gear and rotating about an axis thereof in response to the rotation of the first gear along with the eccentric shaft. The evolution and rotation of the lock gear are stopped by contact of the lock gear stopper with the stationary gear stopper, thereby stopping the output gear from rotating. The lock gear is configured to orient a first mechanical load and a second mechanical load in opposite directions. The first mechanical load is a mechanical load acting on the contact between the lock gear stopper and the stationary gear stopper when the lock gear stopper contacts with the stationary gear stopper. The second mechanical load is a mechanical load acting on meshed portions of teeth of the lock gear and the stationary gear when the lock gear stopper contacts with the stationary gear stopper.

The above structure serves to minimize a mechanical impact exerted on the housing which arises from sudden stop of the revolution and rotation of the lock gear.

BRIEF DESCRIPTION OF THE DRAWINGS

The present disclosure will be understood more fully from the detailed description given hereinbelow and from the accompanying drawings of the preferred embodiments of the invention.

In the drawings:

FIG. 2 is an exploded perspective view which shows a speed reducer-equipped motor, as viewed in a direction opposite that in FIG. 1;

FIG. 3 is an exploded perspective view which illustrates a stationary gear, a transmission gear, and an output gear unit installed in a speed reducer-equipped motor;

FIG. 4B is a sectional view of an eccentric shaft, a stationary gear, a transmission gear, and an output gear unit, as taken along an axial center thereof;

MODES FOR CARRYING OUT THE INVENTION

Figure 1:
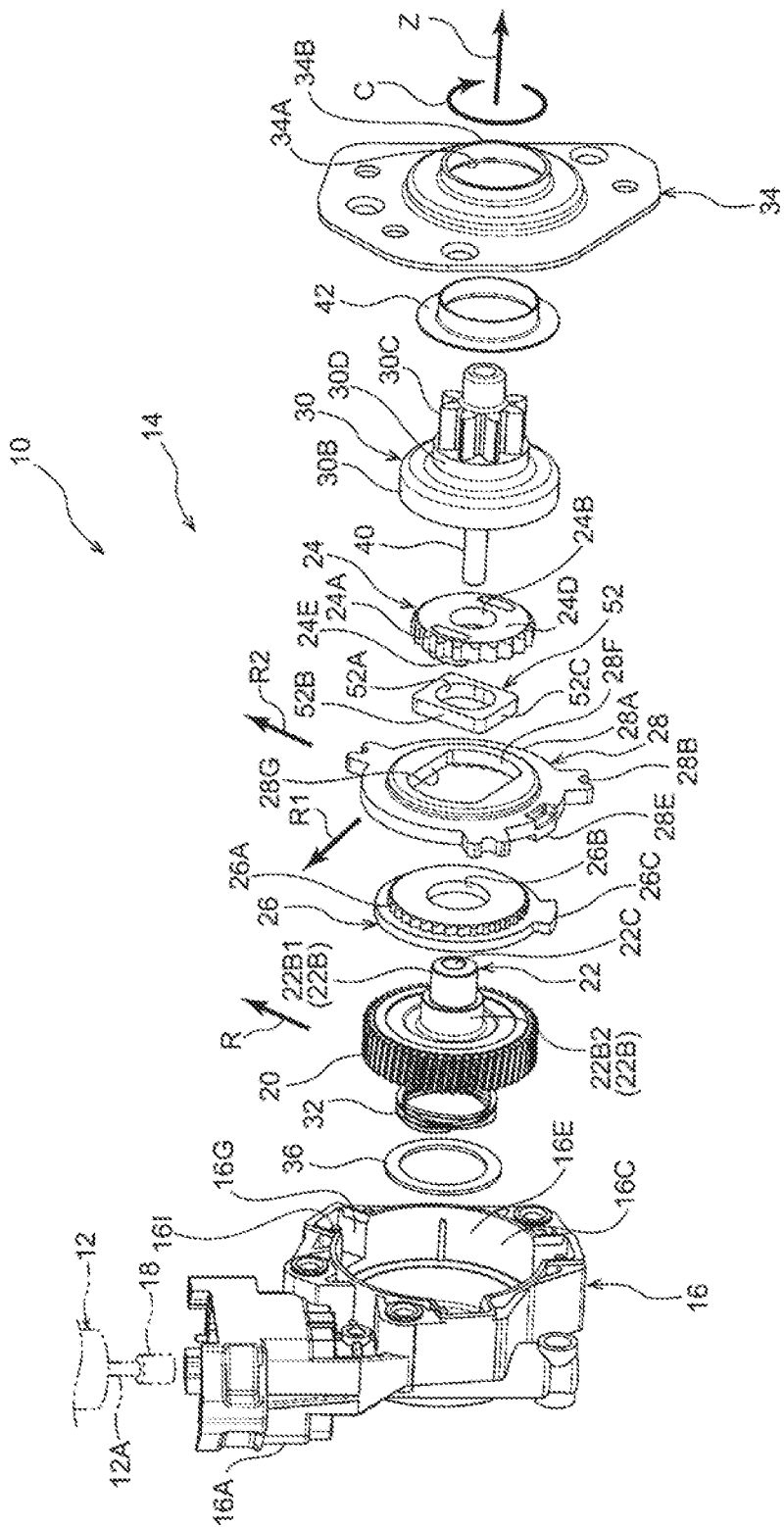
FIG. 1 is an exploded perspective view which shows a speed reducer-equipped motor.

The speed reducer-equipped motor 10 according to the first embodiment of this disclosure will be described below with reference to FIGS. 1 to 4B.

In the drawings, the Z-direction, as denoted by the arrow Z, represents one of opposite axial directions of the pinion gear 30C working as an output gear. The R-direction, as denoted by the arrow R, represents an outward one of opposite radial directions of the pinion gear 30C. The C-direction, as denoted by the arrow C, represents one of opposite circumferential directions of the pinon gear 30C. A direction opposite the Z-direction will also be referred to as a second axial direction of the pinion gear 30C. A direction opposite the R-direction will also be referred to as an inward or second radial direction of the pinion gear 30C. A direction opposite the C-direction will also be referred to as a second circumferential direction of the pinion gear 30C. Unless otherwise specified, an axial direction, a radial direction, and a circumferential direction, as simply referred to below, represent an axial direction, a radial direction, and a circumferential direction of the pinion gear 30C.

The speed reducer-equipped motor 10 illustrated in FIGS. 1, 2, and 3 is designed as a power seat motor working to move the bottom of a car seat in an upward or downward direction. The speed reducer-equipped motor 10 includes the motor 12 implemented by a dc motor. The speed reducer-equipped motor 10 also includes the speed reducer 14 which reduces the speed of rotation of the rotating shaft 12A of the motor 12 and transmits it to the output gear unit 30 serving as an output member of the speed reducer 14. The speed reducer-equipped motor 10 further includes the housing 16 to which the motor 12 is secured and in which the speed reducer 14 is disposed.

The speed reducer 14 includes the worm gear 18, the helical gear 20, and the eccentric shaft 22. The worm gear 18 is firmly secured to the rotating shaft 12A of the motor 12. The helical gear 20 works as a first gear meshing with the worm gear 18. The eccentric shaft 22 is mounted integrally in the helical gear 20.

The speed reducer 14 also includes the transmission gear 24, the lock gear 26, and the stationary gear 28. The transmission gear 24 and the lock gear 26 are retained by the eccentric shaft 22. The stationary gear 28 meshes with the lock gear 26. The speed reducer 14 also includes the slider plate 52 which is retained by the stationary gear 28 and works as a rotation stopper. The rotation of the transmission gear 24 is stopped by meshing the transmission gear 24 with the slider plate 52. The speed reducer 14 also includes the output gear unit 30 which meshes with the transmission gear 24 and is equipped with the pinion gear 30C. The output gear unit 30 has an axis which is oriented in the same direction as those of the helical gear 20, the transmission gear 24, and the lock gear 26, in other words, extends in the Z-direction and a direction opposite the Z-direction. The axis of the output gear unit 30 is arranged in alignment with that of the helical gear 20.

The speed reducer-equipped motor 10 also includes the spring 32 which minimizes the backlash or lost motion of the eccentric shaft 22 and the helical gear 20 in the axial direction thereof. The speed reducer-equipped motor 10 also includes the cover plate 34 which is fixed to the housing 16 to accommodate the speed reducer 14 within the housing 16.

The housing 16 illustrated in FIGS. 1 and 2 is made from resin material. The housing 16 is equipped with the motor retaining portion 16A by which the motor 12 is firmly retained with the rotating shaft 12A extending in a direction perpendicular to the Z-direction. The housing 16 has formed therein the reducer-housing recess 16C in which the speed reducer 14 is accommodated. The reducer-housing recess 16C is of a concave shape with an opening end facing in the axial direction (i.e., the Z-direction).

Figure 4A:
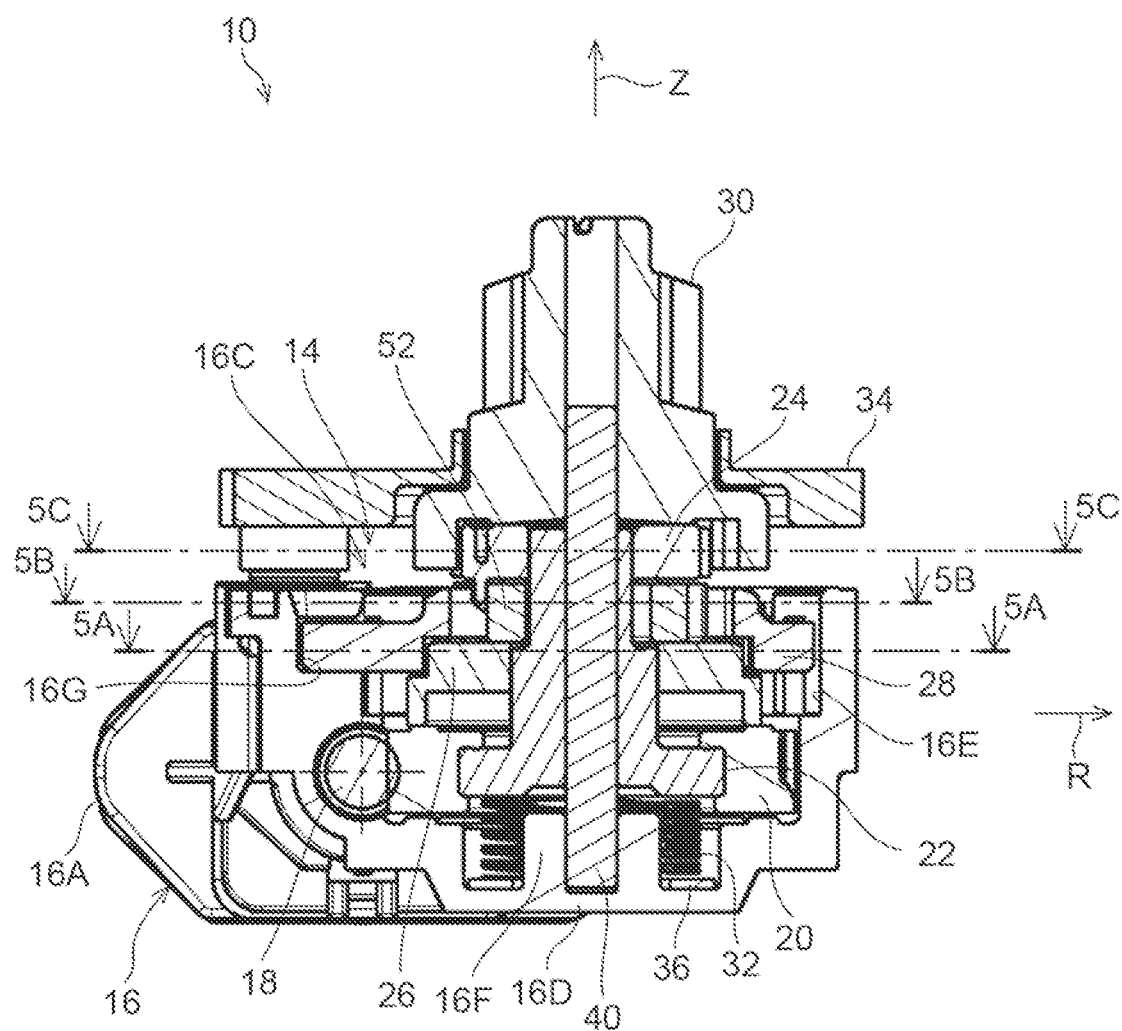
FIG. 4A is a sectional side view of a speed reducer-equipped motor, as taken in an axial direction thereof.

The reducer-housing recess 16C, as clearly illustrated in FIGS. 1 and 4A, includes the bottom wall 16D and the side wall 16E. The bottom wall 16D defines a bottom of the reducer-housing recess 16C. The side wall 16E extends from an outer circumference of the bottom wall 16D in the axial direction and has a cylindrical inner peripheral surface. The reducer-housing recess 16C has the hollow cylindrical boss 16F, which will be described later, into which an end (which will also be referred to as a second end) of the rotation center shaft 40 which faces in the second axial direction is inserted with a clearance between itself and the boss 16F. The spring 32 is arranged around the boss 16F on the bottom wall 16D. The washer 36 is disposed between the bottom wall 16D and the spring 32.

The side wall 16E of the reducer-housing recess 16C formed on an inner periphery thereof three stationary gear engagement portions 16G which a portion of the stationary gear 28, as will be described later in detail, engages to stop the stationary gear 28 from rotating in the circumferential direction thereof. Each of the stationary gear engagement portions 16G includes the cylindrical pole 161.

The cover plate 34 is made of a steel plate. The cover plate 34 has formed therein the exposure opening 34A through which the pinion gear 30C is exposed outside the reducer-housing recess 16C of the housing 16. The cover plate 34 has a peripheral edge which defines the outline of the exposure opening 34A and is bent toward the first axial direction (i.e., the Z-direction) to form the annular rib 34B.

The worm gear 18 has a spiral tooth formed on an outer periphery thereof. The motor 12 mounted on the rotating shaft 12A is secured to the housing 16, thereby placing the worm gear 18 within the housing 16 and close to the bottom and the inner peripheral surface of the reducer-housing recess 16C.

The helical gear 20 illustrated in FIGS. 1 and 2 is made from resin material. The helical gear 20 has formed on the outer periphery thereof a plurality of external teeth meshing with the helical tooth of the worm gear 18. The eccentric shaft 22 is secured into the axial center of the helical gear 20 using insert-molding techniques. The helical gear 20 is rotatably retained by the housing 16 through the eccentric shaft 22 and the rotation center shaft 40.

The eccentric shaft 22 illustrated in FIGS. 2 and 3 is made of metallic material and has a portion inserted into the helical gear 20 so that it rotates along with the helical gear 20. Specifically, the eccentric shaft 22 has the disc 22A which has a thickness in the axial direction and extends in the radial direction thereof. The disc 22A has formed on an outer circumference thereof protrusions which are arranged adjacent each other in the circumferential direction. The disc 22A is firmly fit in the inner periphery of the helical gear 20 with the center axis thereof coinciding with the center of rotation of the helical gear 20.

The eccentric shaft 22 is, as clearly illustrated in FIGS. 1 and 3, equipped with the support 22B which protrudes from the center of the disc 22A in the first axial direction (i.e., the Z-direction). The support 22B has a first end and a second end which is opposed to the first end and faces in the second axial direction. The first end of the support 22B defines the first supporting portion 22B1 by which the transmission gear 24 is, as will be described later in detail, retained to be rotatable. The second end of the support 22B defines the second supporting portion 22B2 which is larger in diameter than the first supporting portion 22B1 and by which the lock gear 26 is, as will be described later in detail, retained to be rotatable. The first supporting portion 22B1 is oriented to have the axial center offset from that of the disc 22A in the outer radial direction (i.e., the R-direction). The second supporting portion 22B2 is oriented to have the axial center offset from that of the disc 22A in the outer radial direction.

The eccentric shaft 22, as illustrated in FIGS. 2, 3, and 4B, has formed therein the axial center through-hole 22C extending through the disc 22A, the first supporting portion 22B1, and the second supporting portion 22B2 in the axial direction thereof. The axial center through-hole 22C has the rotation center shaft inserted thereinto. The axial center of the axial center through-hole 22C (i.e., the axial center of the rotation center shaft 40 inserted into the axial center through-hole 22C) coincides with that of the disc 22A.

The output gear unit 30 illustrated in FIGS. 2 and 4B is made from metallic material. The output gear unit 30, as can be seen in FIG. 2, includes the transmission gear-engaging portion 30B which engages the transmission gear 24. The transmission gear-engaging portion 30B has the recessed housing 30E which opens to the transmission gear 24 (i.e., the second axial direction) in which the transmission gear body 24D of the transmission gear 24 is disposed. The recessed housing 30E has formed in an inner surface of a peripheral portion thereof the internal teeth 30F meshing with the external teeth 24A of the transmission gear 24.

The output gear unit 30 also includes the pinion gear 30C which is arranged on one of axially opposed sides of the transmission gear-engaging portion 30B and axially aligned with the transmission gear-engaging portion 30B. The pinion gear 30C has a plurality of external teeth formed on an outer periphery thereof. The output gear unit 30 has an intermediate portion which is located between the transmission gear-engaging portion 30B and the pinion gear 30C and defines the axially-supported portion 30D which is supported by the rib 34B of the cover plate 34. The rib 34B has firmly fit in an inner periphery thereof the bearing bush 42 made from resin material. This avoids or minimizes a risk that the axially-supported portion 30D of the output gear unit 30 and the rib 34B of the cover plate 34 may experience metal-contact with each other. The output gear unit 30 has the rotation center shaft 40 press-fit in the axial center thereof. The rotation center shaft 40 is of a bar shape made from metallic material.

The stationary gear 28 is produced by pressing metallic material. The stationary gear 28 is, as illustrated in FIGS. 1 and 2, equipped with the stationary gear body 28A of an annular shape, as viewed in the axial direction. The stationary gear 28 has formed on an outer periphery thereof three fitting protrusions 28B which extend radially outwardly from the stationary gear body 28A. When the fitting protrusions 28B are fit on the stationary gear engagement portions 16G of the housing 6, a push nut, not shown, is fit on the cylindrical poles 161, thereby achieving securement of the stationary gear 28 to the housing 16.

Figure 5A:
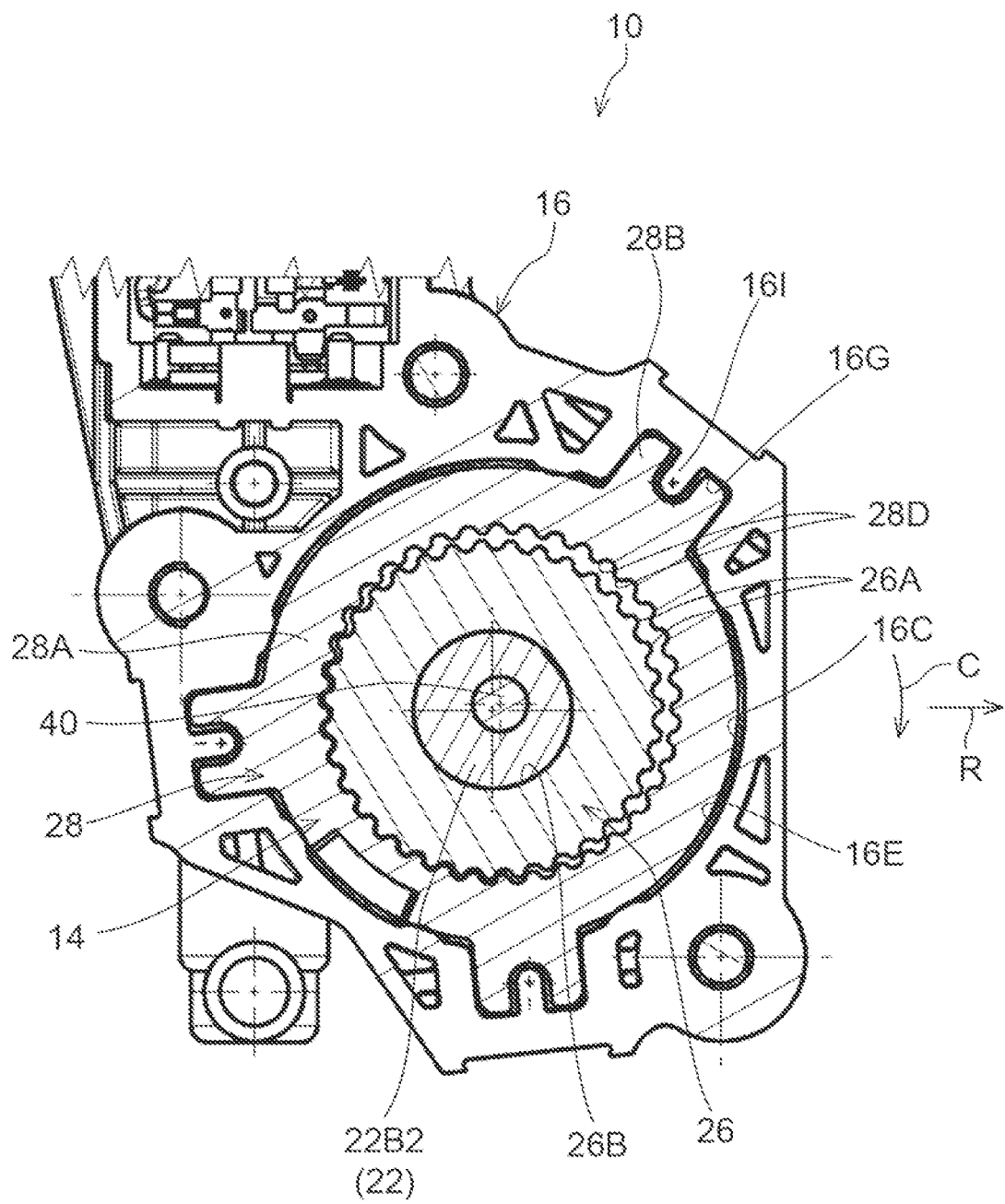
FIG. 5A is a sectional plan view, as taken along a line 5A-5A in FIG. 4A, which illustrates the speed reducer-equipped motor in FIG. 4A.

The stationary gear body 28A, as illustrated in FIGS. 1, 2, and 5A, has formed in an inner periphery thereof a plurality of internal teeth 28D which mesh with the lock gear 26 which will be described later in detail.

The stationary gear 28 is also equipped with the second stopper 28E which serves as a stationary gear stopper and, as illustrated in FIGS. 1 and 2, protrudes from the stationary gear body 28A in the second axial direction (which is opposite to the Z-direction). Specifically, the second stopper 28E protrudes in the second axial direction from a portion of the circumference of the stationary gear body 28A.

Figure 5B:
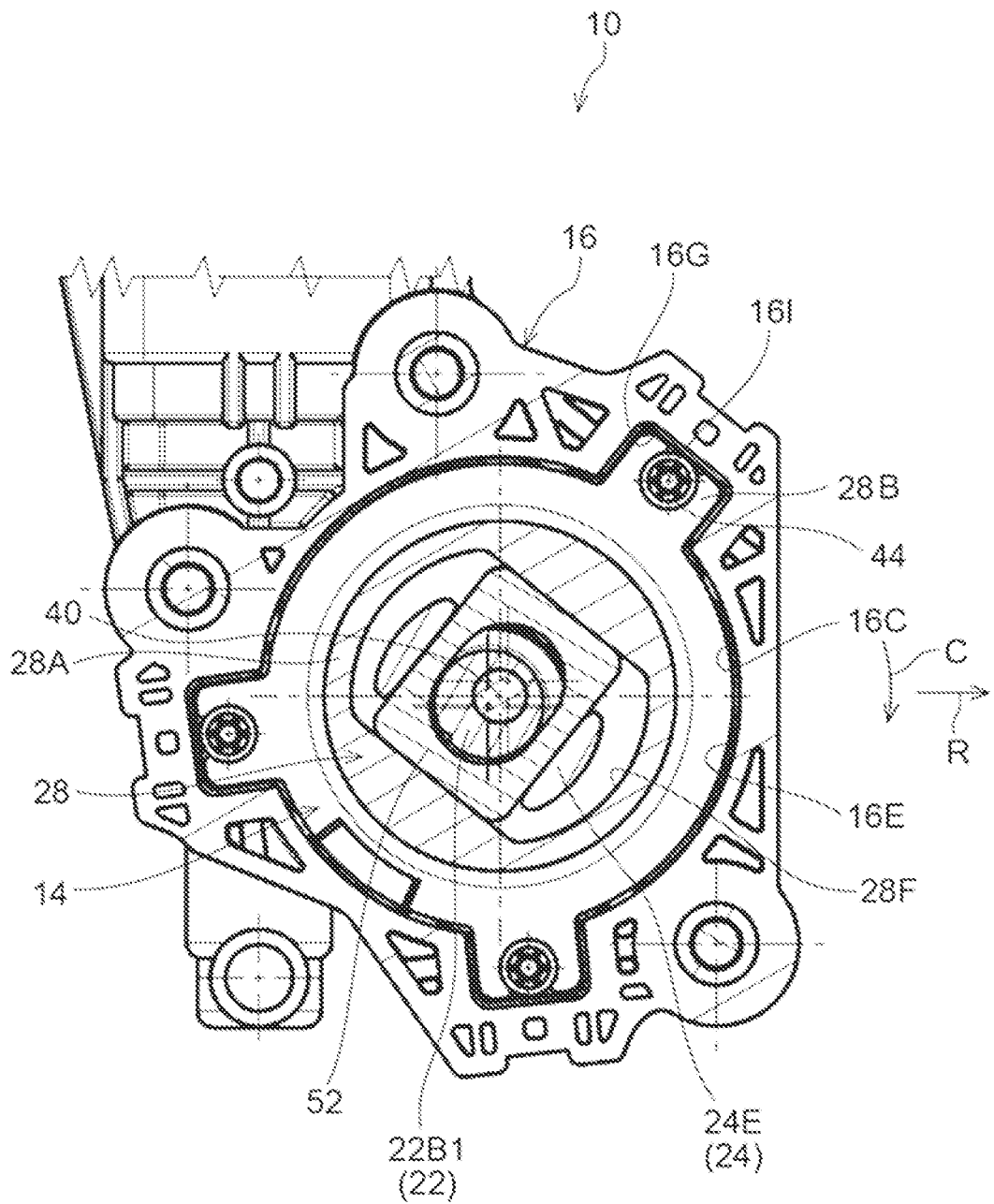
FIG. 5B is a sectional plan view, as taken along a line 5B-5B in FIG. 4A, which illustrates the speed reducer-equipped motor in FIG. 4A.

The stationary gear body 28A of the stationary gear 28, as illustrated in FIGS. 1, 2, and 5B, has the slider plate-fitting hole 28F formed in a first one of walls thereof opposed to each other in the axial direction. The first wall of the stationary gear body 28A has the internal teeth 28D formed therein. The slider plate-fitting hole 28F is shaped to have a rectangular outline, as viewed in the axial direction. The slider plate 52 is disposed inside the slider plate-fitting hole 28F. The slider plate 52 has a pair of first slider surfaces 52C which will be described later in detail. The slider plate-fitting hole 28F has the second slider surfaces 28G which are defined by inner opposed edges of the slider plate 52 and face each other in the radial direction of the slider plate 52. The slider plate 52 is disposed in the slider-plate fitting hole 27F with each of the first slider surfaces 52C facing one of the second slider surfaces 28G of the slider plate-fitting hole 28F. The first slider surfaces 52C and the second slider surfaces 28G are placed to face each other to stop the slider plate 52 from rotating relative to the stationary gear 28. The first slider surfaces 52C are slidable on the second slider surfaces 28G to permit the slider plate 52 and the transmission gear 24 to move in the radial direction R1 that is an outward radial direction of the stationary gear 28. This causes the transmission gear 24 to revolve around the axial center of the rotation center shaft 40 following rotation of the eccentric shaft 22 while stopping the transmission gear 24 mounted on the first supporting portion 22B1 of the eccentric shaft 22 from rotating around the axis thereof.

The transmission gear 24 is, as illustrated in FIGS. 1, 2, 3, 4B, and 5C, produced by pressing a metallic material into a circular shape. The transmission gear 24 includes the transmission gear body 24D which has the external teeth 24A formed on the outer circumference thereof. The transmission gear body 24D has formed in the center thereof the fitting hole 24B which fits on the first supporting portion 22B1 of the eccentric shaft 22. The transmission gear 24 has two stopper protrusions 24E which extend from an end surface of the transmission gear body 24D which faces in the second axial direction. The stopper protrusions 24E are arranged at an angular interval of 180° away from each other in the circumferential direction of the transmission gear 24. The stopper protrusions 24E engages the slider plate 52, as will be described later in detail, to stop the eccentric shaft 22 of the transmission gear 24 from rotating around the first supporting portion 22B1 of the eccentric shaft 22 (i.e., around the center axis of the eccentric shaft 22).

The slider plate 52 illustrated in FIGS. 1 and 3 is made of a metallic plate and of a rectangular shape, as viewed in the axial direction. The slider plate 52 is arranged between the two stopper protrusions 24E of the transmission gear 24 within the slider plate-fitting hole 28F of the stationary gear 28. The slider plate 52 has the engaging surfaces 52B on the circumference thereof. Each of the engaging surfaces 52B faces a respective one of the stopper protrusions 24E in the radial direction. In the condition where the slider plate 52 is placed between the stopper protrusions 24E of the transmission gear 24, the stopper protrusions 24E work to stop the transmission gear 24 from moving relative to the slider plate 52 in a direction (i.e., the radial direction R1) in which the engaging surfaces 52B and the stopper protrusions 24E face each other and also stop the transmission gear 24 from rotating relative to the slider plate 52 (i.e., around the center of the transmission gear 24). The stopper protrusions 24E are slidable on the engaging surfaces 52B, thereby permitting the transmission gear 24 to move relative to the slider plate 52 in a direction in which the engaging surfaces 52B and the stopper protrusions 24E slide on each other in the second radial direction R2 perpendicular to the radial direction R1. The outer periphery of the slider plate 52 has the pair of first slider surfaces 52C which faces the second slider surfaces 28G of the slider plate-fitting hole 28F and are arranged close to the slider surfaces 28G. The slider plate 52 has formed in the center thereof the elongated hole 52A into which the first supporting portion 22B1 of the eccentric shaft 22 is inserted. The elongated hole 52A is shaped to have a length extending in the second radial direction R2. The interval or distance between the engaging surfaces 52B of the slider plate 52 is selected to be smaller than that between the first slider surfaces 52C. The engaging surfaces 52B, therefore, define long opposite sides of the rectangular shape of the slider plate 52, while the first slider surfaces 52C define short opposite sides of the rectangular shape of the slider plate 52.

The lock gear 26 is, like the transmission gear 24, as illustrated in FIGS. 1 and 2, made by pressing a metallic material into a disc shape. The lock gear 26 has formed on the whole of an outer periphery thereof external teeth 26A meshing with the internal teeth 28D of the stationary gear 28. The lock gear 26 has formed in the center thereof the fitting hole 26B which is fit on the second supporting portion 22B2 of the eccentric shaft 22. The lock gear 26 also includes the first stopper 26C which extends radially outwardly and has a fan-shape, as viewed in the axial direction. The first stopper 26C is formed on a portion of the circumference of the lock gear 26. In a condition where the external teeth 26A of the lock gear 26 mesh with the internal teeth 28D of the stationary gear 28, the first stopper 26C is located over one of major opposite surfaces of the stationary gear body 28A of the stationary gear 28 which faces in the second axial direction.

Operation and Advantageous Effect of this Embodiment

The operation of and advantageous effects offered by this embodiment will be described below.

In the speed reducer-equipped motor 10 illustrated in FIGS. 1 and 2, when the rotating shaft 12A of the motor 12 starts to rotate, it will cause the worm gear 18 to rotate. The rotation of the worm gear 18 causes the helical gear 20 which meshes with the worm gear 18 to rotate along with the eccentric shaft 22.

Figure 5C:
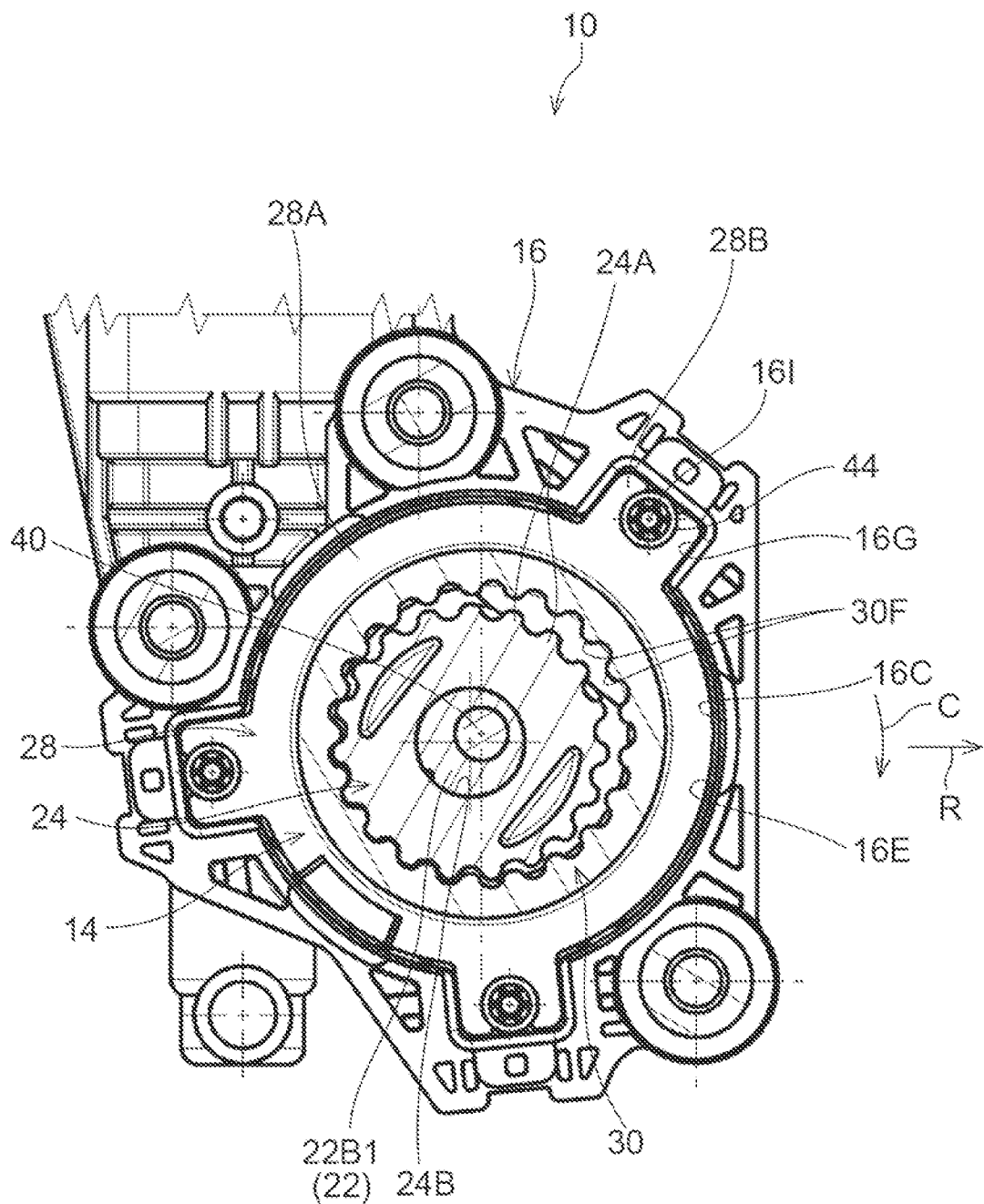
FIG. 5C is a sectional plan view, as taken along a line 5C-5C in FIG. 4A, which illustrates the speed reducer-equipped motor in FIG. 4A.

The rotation of the eccentric shaft 22 causes the center of the transmission gear 24 mounted on the first supporting portion 22B1 of the eccentric shaft 22 to revolve around the center of the rotation center shaft 40. Specifically, referring to FIG. 5, when the eccentric shaft 22 rotates, the stopper protrusions 24E of the transmission gear 24 slide on the engaging surfaces 52B of the slider plate 52 and move in the radial direction (i.e., opposite to the direction R2). The first slider surfaces 52C of the slider plate 52 also slides on the second slider surfaces 28G of the stationary gear 28, so that the slider plate 52 and the transmission gear 24 are moved in the radial direction (i.e., opposite the direction R1). This causes the center of the transmission gear 24 to revolve around the center of the rotation center shaft 40 while holding the transmission gear 24 mounted on the first supporting portion 22B1 of the eccentric shaft 22 from rotating around the center axis thereof The revolution of the transmission gear 24, as illustrated in FIGS. 1, 2, and 5C, causes torque produced by such revolution to be transmitted from the external teeth 24A of the transmission gear 24 to the output gear unit 30 through the internal teeth 30F of the output gear unit 30. This causes the output gear unit 30 to rotate, thereby actuating the power seat of the vehicle through a gear meshing with the pinion gear 30C of the output gear unit 30.

The rotation of the eccentric shaft 22, as illustrated in FIGS. 1, 2, and 5A, causes the lock gear 26 which is mounted on the second supporting portion 22B2 of the eccentric shaft 22 and meshes with the stationary gear 28 to revolute around the center of the rotation center shaft 40 and also rotates around the center axis thereof. When the first stopper 26C of the lock gear 26 contacts with the second stopper 28E of the stationary gear 28, it stops both the rotation and the revolution of the lock gear 26. This holds the eccentric shaft 22 and the helical gear 20 from rotating, thereby stopping the rotation of the output gear unit 30. This avoids or minimizes input of undesirable excessive torque from the speed reducer-equipped motor 10 to the power seat of the vehicle.

The speed reducer 14 which constitutes a portion of the structure of the speed reducer-equipped motor 10 is, as described above, designed as a planetary gear speed reducer. It is, therefore, preferable that a gear which is required to stop its rotation is selected depending upon a speed reduction ratio which the speed reducer 14 is required to have. Specifically, the speed reducer 14 may be implemented by 2K-H planetary gear mechanism, a 3K planetary gear mechanism, a solar speed reducer, or a star speed reducer depending upon a speed reduction ratio required for the speed reducer 14.

Structure Alleviating Impact on the Housing 16

The structure to absorb mechanical impact exerted on the housing 16 upon stop of revolution and rotation of the lock gear 26 will be described below in detail.

Figure 6:
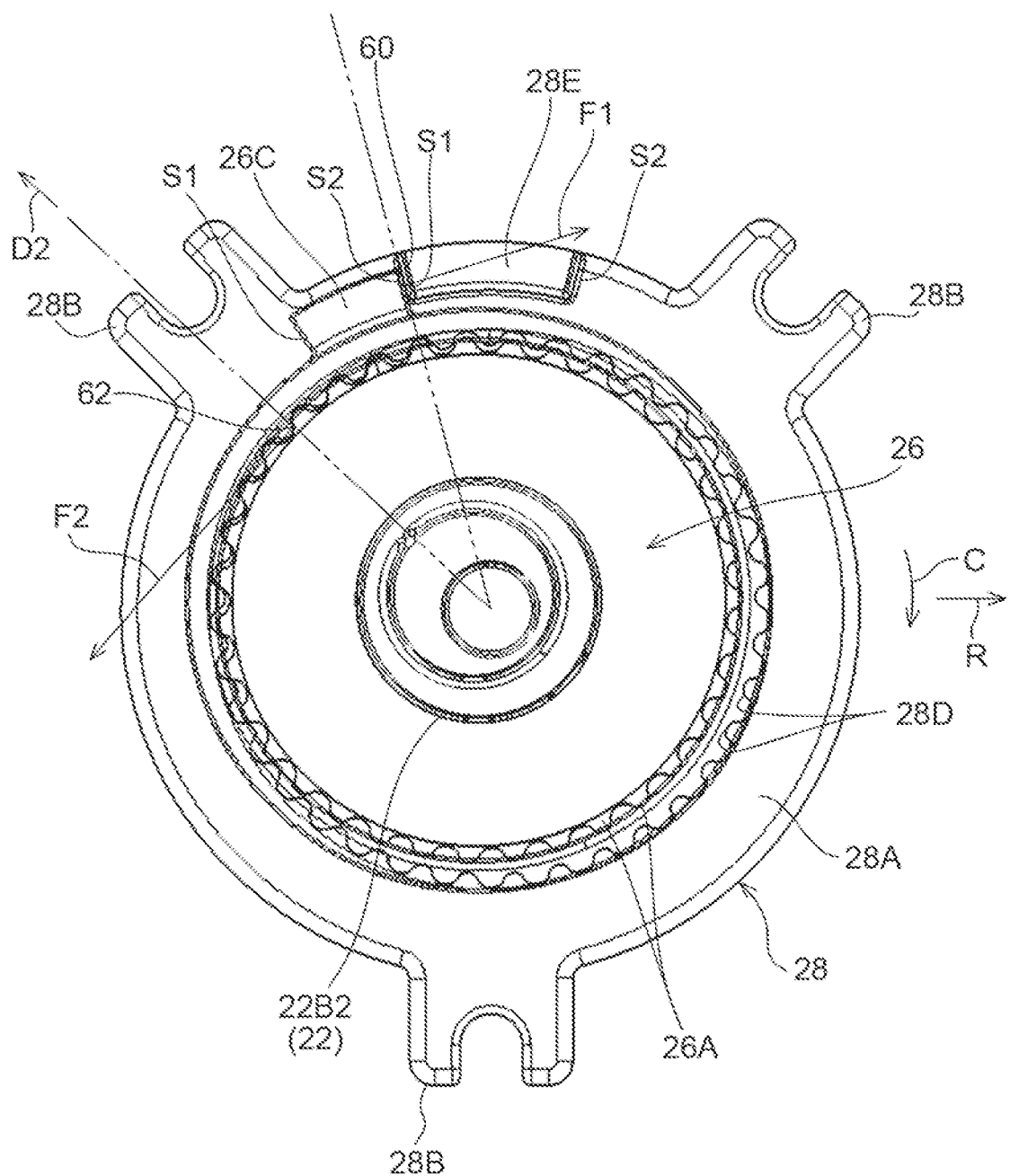
FIG. 6 is a plan view which illustrates meshed portions of teeth of a stationary gear and a lock gear of a speed reducer-equipped motor when a first stopper and a second stopper contact with each other in the first embodiment.

In speed reducer-equipped motor 10 in the first embodiment, the stop of rotation of the output gear unit 30 is, as illustrated in FIG. 6, achieved by contacting the first stopper 26C of the lock gear 26 with the second stopper 28E of the stationary gear 28 to stop the revolution and rotation of the lock gear 26. This structure will generate the mechanical load F1 (which will also be referred to as first mechanical load) acting on the contact between the first stopper 26C of the lock gear 26 and the second stopper 28E of the stationary gear 28 and also generate the mechanical load F2 (which will also be referred to as second mechanical load) acting on meshed or mating portions of the external teeth 26A of the lock gear 26 and the internal teeth 28D of the stationary gear 28.

Specifically, the end surfaces S1 of the first stopper 26C which face in opposite circumferential directions of the lock gear 26 are, as viewed in the axial direction, flat and extend along a line defined to pass through the center of rotation of the eccentric shaft 22 in the radial direction of the eccentric shaft 22. Similarly, the end surfaces S2 of the second stopper 28E which face in the opposite circumferential directions of the lock gear 26 are, as viewed in the axial direction, flat and extend along the line defined to pass through the center of rotation of the eccentric shaft 22 in the radial direction of the eccentric shaft 22. The contact 60 (i.e., a surface of contact) between the first stopper 26C and the second stopper 28E is subjected to the load F1 oriented in a direction perpendicular to the end surfaces S1 of the first stopper 26C and the end surfaces S2 of the second stopper 28E.

The mating portions of the external teeth 26A of the lock gear 26 and the internal teeth 28D of the stationary gear 28 changes in the circumferential direction following the revolution and rotation of the lock gear 26. The external teeth 26A of the lock gear 26 and the internal teeth 28D of the stationary gear 28 mesh with each other most deeply in the radial direction at a position along the offset direction D2 in which the center of the second supporting portion 22B2 on which the lock gear 26 is retained is offset from the rotation center shaft 40. In the following discussion, portions of the external teeth 26A of the lock gear 26 and the internal teeth 28D of the stationary gear 28 which mating or mesh with each other most deeply in the radial direction thereof will also be referred to as a teeth-mesh center 62. At the teeth-mesh center 62, one of the external teeth 26A of the lock gear 26 is most deeply inserted into between adjacent two of the internal teeth 28D of the stationary gear 28. When the first stopper 26C and the second stopper 28E contact with each other, it will generate the load F2 at the teeth-mesh center 62 which acts in a direction in which a line tangent to the rotating lock gear 26 extends.

The loads F1 and F2 are transmitted to the housing 16 through the stationary gear 28.

This embodiment is designed to orient the load F1 and the load F2 in opposite directions at a time when the first stopper 26C of the lock gear 26 physically contacts with the second stopper 28E of the stationary gear 28. The load F1 acts on the contact 60 between the first stopper 26C and the second stopper 28E. The load F2 acts on the teeth-mesh center 62 that represents the location where portions of the external teeth 26A of the lock gear 26 and the internal teeth 28D of the stationary gear 28 mesh with each other most deeply. The above directional cause the load F1 and the load F2 to be cancelled each other, thereby minimizing a resultant force that corresponds to the sum of the loads F1 and F2 and is transmitted to the housing 16 through the stationary gear 28. This alleviate or minimize the mechanical impact exerted on the housing 16 at the time when the lock gear 26 is stopped from revolving and rotating.

The fact that the load F1 exerted on the contact 60 between the first stopper 26C and the second stopper 28E and the load F2 exerted on the teeth-mesh center 62 corresponding to the mating portions of the external teeth 26A of the lock gear 26 and the internal teeth 28D of the stationary gear 28 are oriented in opposite directions, as viewed in the axial direction, does not necessarily represent that the load F1 is oriented 180° away from the load F2. The load F1 and the load F2 may be oriented in directions which are different from each other and lie in a range where the magnitude of load F1 is reduced by that of the load F2 as needed.

This embodiment is also designed to have the fitting protrusions 28B arranged adjacent to each other in the circumferential direction of the stationary gear 28. An interval between an adjacent two of the fitting protrusions 28E between which the second stopper 28E is disposed is selected to be smaller in the circumferential direction of the stationary gear 28 than that between an adjacent two of the other fitting protrusions 28B. This causes the load F1 acting on the contact 60 between the first stopper 26C and the second stopper 28E to be distributed to the adjacent fitting protrusions 28B between which the second stopper 28E is arranged.

Speed Reducer-Equipped Motor in the Second Embodiment

A speed reducer-equipped motor according to the second embodiment will be described below. Parts of the speed reducer-equipped motor in this embodiment which are identical in structure with those of the speed reducer-equipped motor 10 in the first embodiment will be denoted using the same or similar reference numbers or symbols as those employed in the first embodiment, and explanation thereof in detail will be omitted here.

Figure 7:
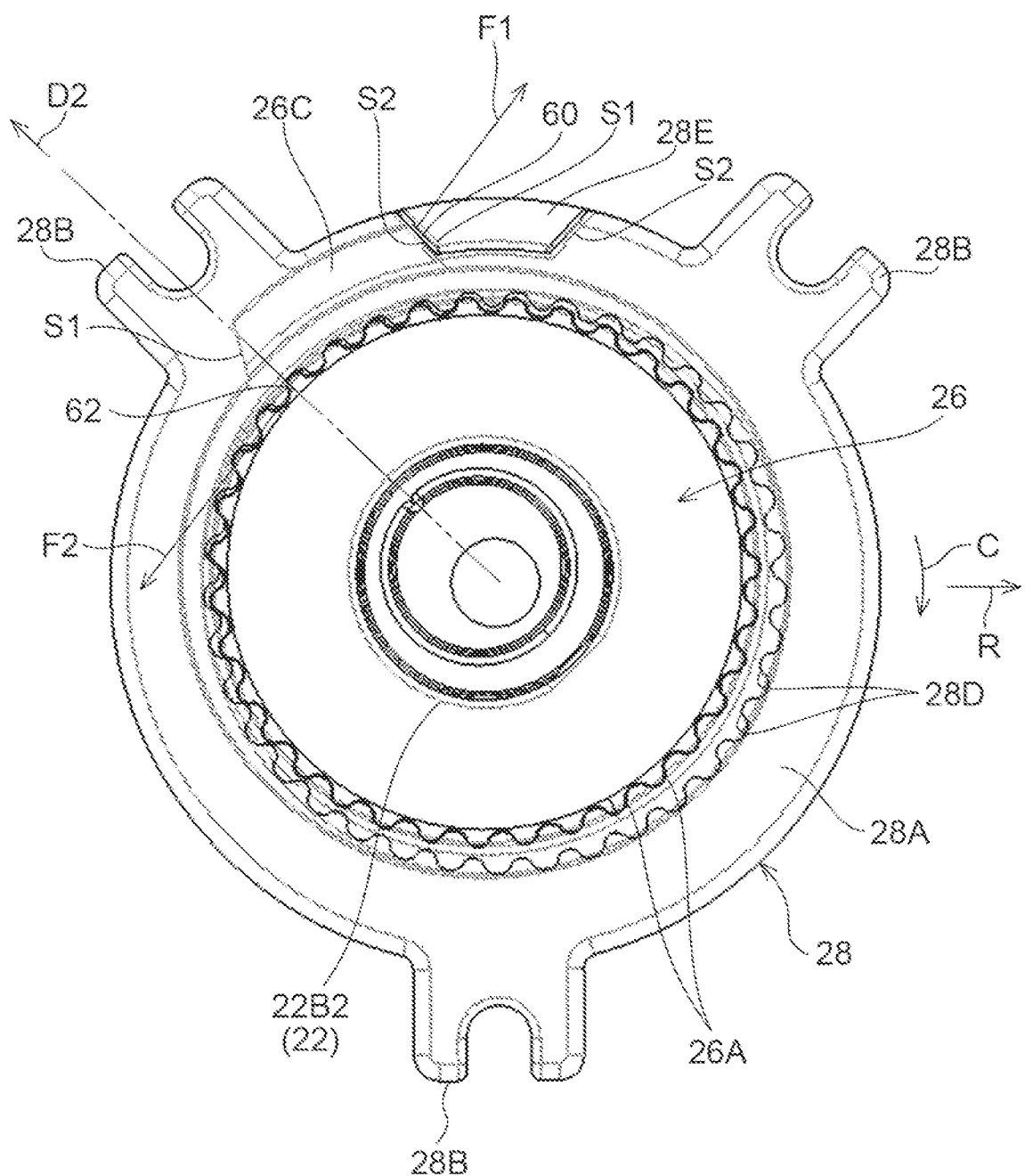
FIG. 7 is a plan view which illustrates meshed portions of teeth of a stationary gear and a lock gear of a speed reducer-equipped motor when a first stopper and a second stopper contact with each other in the second embodiment.

The speed reducer-equipped motor in the second embodiment is, as illustrated in FIG. 7, designed to orient the load F1 exerted on the contact 60 between the first stopper 26C and the second stopper 28E in a direction different from that in the speed reducer-equipped motor 10 in the first embodiment. Specifically, the first stopper 26C of the lock gear 26 is in a trapezoidal shape with lateral sides having a circumferential interval therebetween which decreases radially outwardly of the lock gear 26, as viewed in the axial direction. Similarly, the second stopper 28E of the stationary gear 28 is in a trapezoidal shape with lateral sides having a circumferential interval therebetween which decreases radially inwardly of the stationary gear 28, as viewed in the axial direction. The circumferentially opposed end surfaces S1 of the first stopper 26C are, therefore, oriented, as viewed in the axial direction, to slant relative to a line defined to extend through the center of rotation of the eccentric shaft 22 in the radial direction of the eccentric shaft 22. Similarly, the circumferentially opposed end surfaces S2 of the second stopper 28E are oriented to slant relative to the line defined to extend through the center of rotation of the eccentric shaft 22 in the radial direction of the eccentric shaft 22. The above configurations of the first stopper 26C and the second stopper 28E orient the load F1 acting on the contact 60 between the first stopper 26C and the second stopper 28E in a direction 180 degrees opposite a direction in which the load F2 acts on the teeth-mesh center 62 corresponding to the mating portions of the external teeth 26A of the lock gear 26 and the internal teeth 28D of the stationary gear 28. In other words, a vector F1 which represents a magnitude and a direction of a physical load on the contact 60 between the first stopper 26C and the second stopper 28E, as viewed in the axial direction of the eccentric shaft 22, and a vector F2 which represents a magnitude and a direction of a physical load on the teeth-mesh center 62 corresponding to mating portions of the external teeth 26A of the lock gear 26 and the internal teeth 28D and the stationary gear 28, as viewed in the axial direction of the eccentric shaft 22, are oriented in opposite directions on a single straight line, that is, aligned with each other in opposite directions. Such a structure of the speed reducer-equipped motor in the second embodiment is capable of greatly reducing the load F1 acting on the contact 60 between the first stopper 26C and the second stopper 28E using the load F2 acting on the teeth-mesh center 62 corresponding to the mating portions of the external teeth 26A of the lock gear 26 and the internal teeth 28D of the stationary gear 28 as compared with the speed reducer-equipped motor 10 in the first embodiment, thereby greatly alleviating the mechanical impact on the housing 16 which arises from the stop of revolution and rotation of the lock gear 26.

In this embodiment, the first stopper 26C is located, as viewed in the axial direction, on a line defined to extend in the radial direction of the lock gear 26 from the teeth-mesh center 62 corresponding to the mating portions of the external teeth 26A of the lock gear 26 and the internal teeth 28D of the stationary gear 28. This layout achieves contact between the first stopper 26C and the second stopper 28E at a location closer to the teeth-mesh center 62 than in the first embodiment, as viewed in the axial direction. The structure of the speed reducer-equipped motor in the second embodiment, therefore, enables the first stopper 26C to be located more radially outwardly than in the speed reducer-equipped motor 10 in the first embodiment when the first stopper 26C and the second stopper 28E, thereby ensuring a desired amount of overlap between the first stopper 26C and the second stopper 28E in the circumferential direction.

Speed Reducer-Equipped Motors in the Third and Fourth Embodiments

A speed reducer-equipped motor according to the third embodiment will be described below. Parts of the speed reducer-equipped motors in the third and fourth embodiments which are identical in structure with those in the first and second embodiments are denoted by the same or similar reference numbers or symbols, and explanation thereof in detail will be omitted here.

Figure 8:
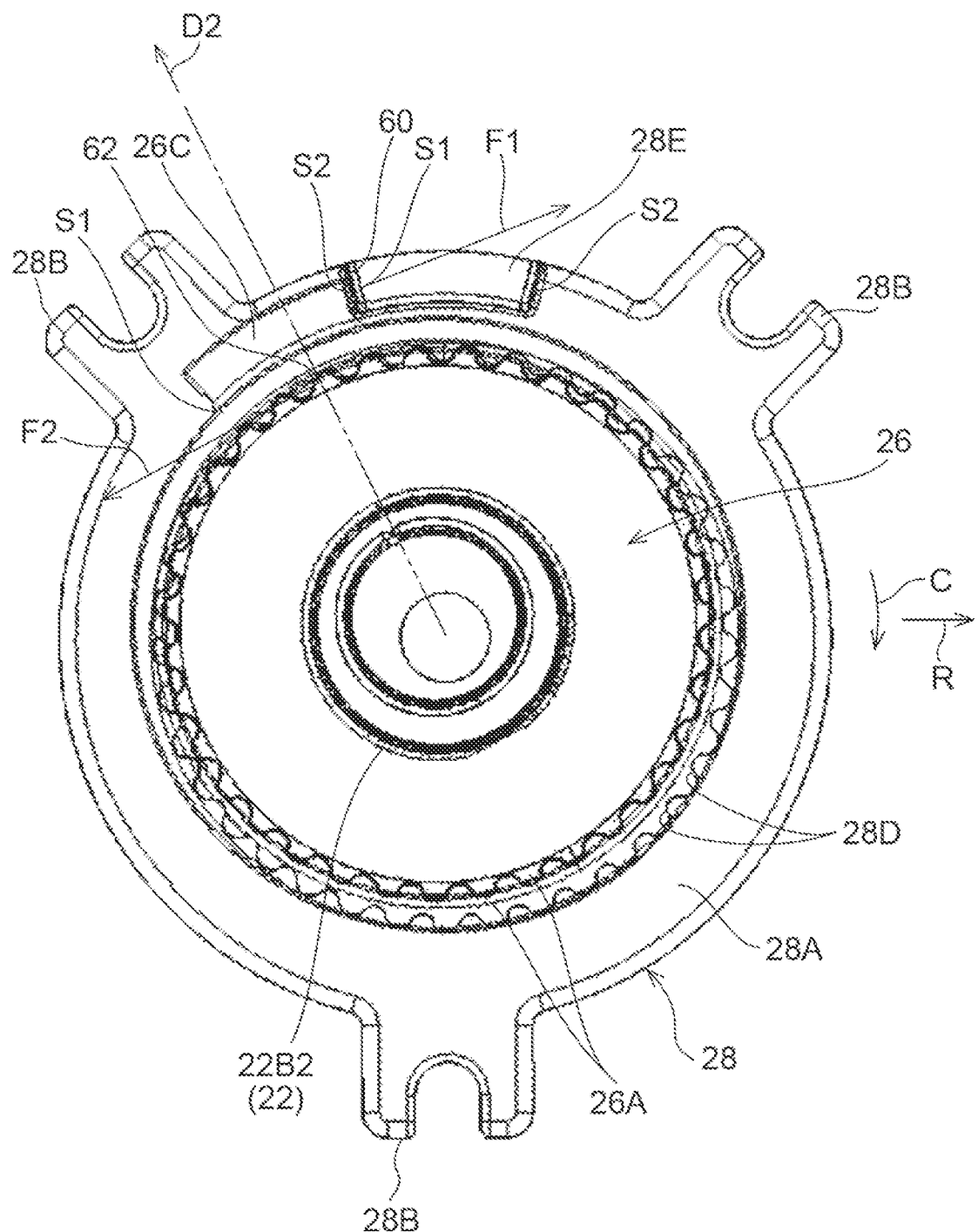
FIG. 8 is a plan view which illustrates meshed portions of teeth of a stationary gear and a lock gear of a speed reducer-equipped motor when a first stopper and a second stopper contact with each other in the third embodiment.

The speed reducer-equipped motor in the third embodiment is, as illustrated in FIG. 8, designed to have the first stopper 26C located on a line defined to extend from the teeth-mesh center 62 corresponding to the mating portions of the external teeth 26A of the lock gear 26 and the internal teeth 28D of the stationary gear 28 in the radial direction there of the lock gear 26 or the stationary gear 28. The speed reducer-equipped motor is also configured to have the teeth-mesh center 62 located closer to the contact 60 between the first stopper 26C and the second stopper 28E than in the second embodiment. This minimizes a risk that an overlap between the first stopper 26C and the second stopper 28E in the circumferential direction may be decreased by some cause.

Figure 9:
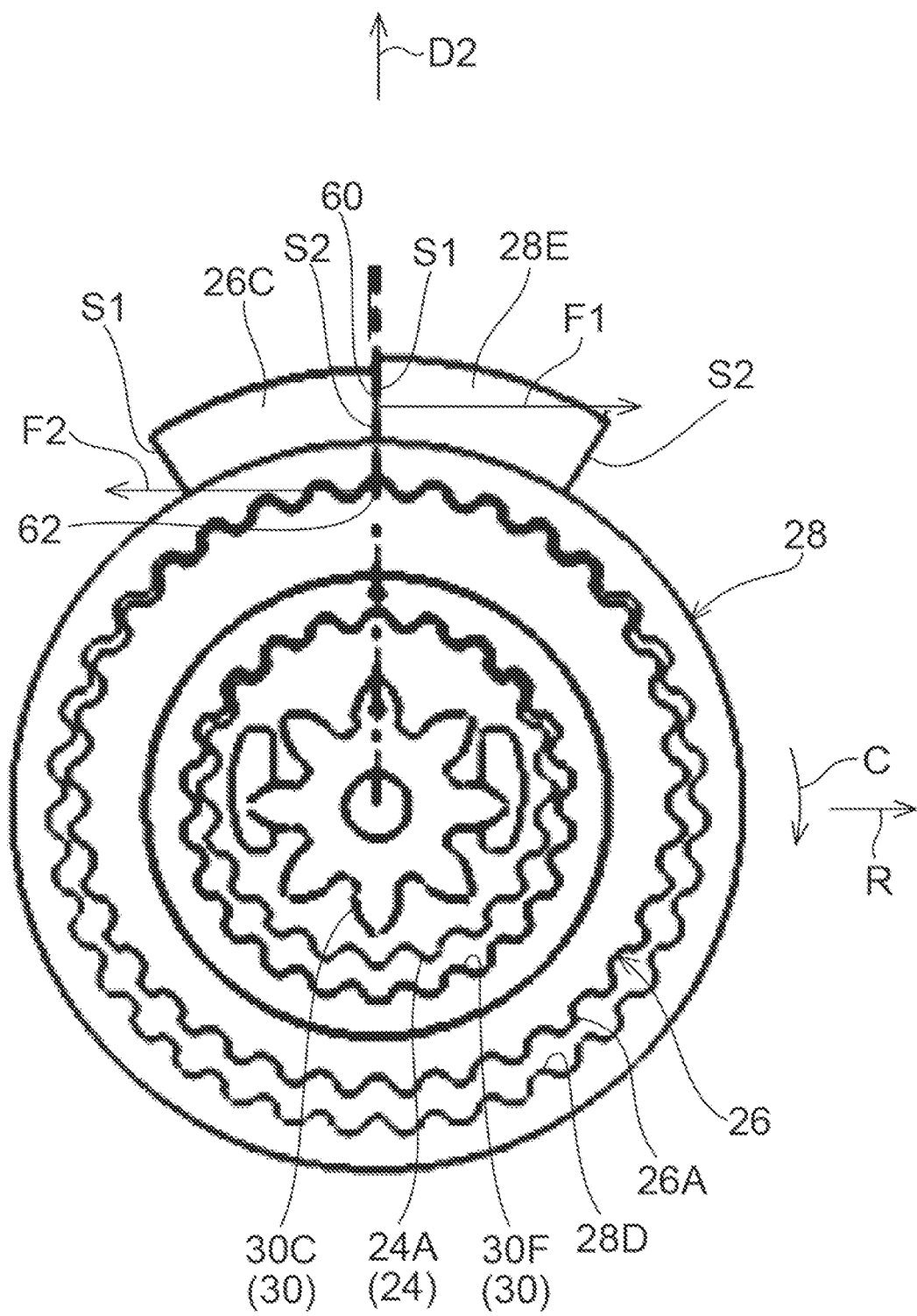
FIG. 9 is a plan view which illustrates meshed portions of teeth of a stationary gear and a lock gear of a speed reducer-equipped motor when a first stopper and a second stopper contact with each other in the fourth embodiment.

The speed reducer-equipped motor in the fourth embodiment is, as illustrated in FIG. 9, designed to have the contact 60 of the first stopper 26C with the second stopper 28E which is located on a line defined to extend in the radial direction of the lock gear 26 from the teeth-mesh center 62 representing the location of the mating portions of the external teeth 26A of the lock gear 26 and the internal teeth 28D of the stationary gear 28. In other words, positions of the teeth-mesh center 62 and the contact 60 between the first stopper 26C and the second stopper 28E coincide with each other in the circumferential direction of the eccentric shaft 22. To say it in a different way, the teeth-mesh center 62 and the contact 60 are aligned with each other in the radial direction of the eccentric shaft 22 (or the lock gear 26 and the stationary gear 28). This layout of the teeth-mesh center 62 and the contact 60 further minimizes the risk that an overlap between the first stopper 26C and the second stopper 28E in the circumferential direction may be decreased by some cause as compared with in the third embodiment.

The embodiments of this disclosure have been described above, but however, this disclosure is not limited to the above statements. The disclosure should be understood to include all possible embodiments and modifications to the shown embodiments which can be embodied without departing from the principle of the disclosure.

This disclosure is not limited to the above embodiments, but may be realized by various embodiments without departing from the purpose of the disclosure. This disclosure includes all possible combinations of the features of the above embodiments or features similar to the parts of the above embodiments. The structures in this disclosure may include only one or some of the features discussed in the above embodiments unless otherwise inconsistent with the aspects of this disclosure.

What is claimed is:

1. A speed reducer-equipped motor comprising:
a motor with a rotating shaft;
a first gear which rotates in response to input of torque from the rotating shaft of the motor;
an eccentric shaft which connects with the first gear and includes a first support and a second support which are offset from a rotating shaft of the first gear in a radial direction thereof;
a stationary gear which is arranged outside the eccentric shaft in a radial direction of the eccentric shaft and includes a stationary gear stopper, the stationary gear being stopped from rotating by securement thereof with a housing;
a transmission gear which is retained by the first support and revolves around the rotating shaft of the first gear in response to rotation of the first gear together with the eccentric shaft;
an output member which rotates in response to revolution of the transmission gear; and
a lock gear which is retained by the second support, meshes with the stationary gear, and includes a lock gear stopper, the lock gear revolving around the rotating shaft of the first gear and rotating about an axis thereof in response to the rotation of the first gear along with the eccentric shaft, revolution and rotation of the lock gear being stopped by contact of the lock gear stopper with the stationary gear stopper, thereby stopping the output gear from rotating, the lock gear being configured to orient a first mechanical load and a second mechanical load in opposite directions, the first mechanical load being a mechanical load acting on a contact between the lock gear stopper and the stationary gear stopper when the lock gear stopper contacts with the stationary gear stopper, the second mechanical load being a mechanical load acting on meshed portions of teeth of the lock gear and the stationary gear when the lock gear stopper contacts with the stationary gear stopper.

2. The speed reducer-equipped motor as set forth in claim 1, wherein the contact between the lock gear stopper and the stationary gear stopper is located close to the meshed portions of the meshed portions of the teeth of the lock gear and the stationary gear, as viewed in an axial direction of the eccentric shaft.

3. The speed reducer-equipped motor as set forth in claim 2, wherein a circumferential position of the meshed portions of the teeth of the lock gear and the stationary gear coincides with a circumferential position of the contact between the lock gear stopper and the stationary gear stopper, as viewed in the axial direction of the eccentric shaft.

4. The speed reducer-equipped motor as set forth in claim 1, wherein a vector which represents a magnitude and a direction of a physical load on the contact between the lock gear stopper and the stationary gear stopper, as viewed in the axial direction of the eccentric shaft, and a vector which represents a magnitude and a direction of a physical load on the meshed portions of the teeth of the lock gear and the stationary gear are oriented in opposite directions on a single straight line.

5. The speed reducer-equipped motor as set forth in claim 1, wherein the stationary gear has a plurality of housing fitting protrusions which are secured to the housing and arranged away from each other in a circumferential direction of the stationary gear, and an interval between an adjacent two of the housing fitting protrusions between which the stationary gear stopper is disposed is selected to be smaller in a circumferential direction of the stationary gear than that between an adjacent two of the other housing fitting protrusions.

\* \* \* \* \*